A. L. NEGSTAD.
AUTOMOBILE BRAKE.
APPLICATION FILED JAN. 22, 1916.
1,205,378.
Patented Nov. 21, 1916.
3 SHEETS—SHEET 3.
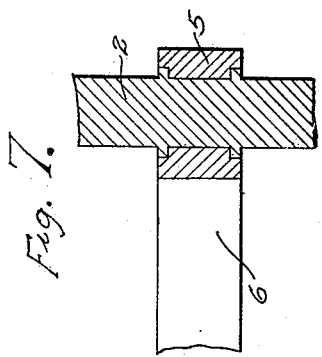
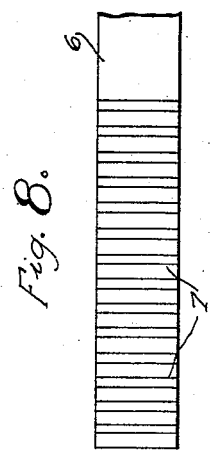
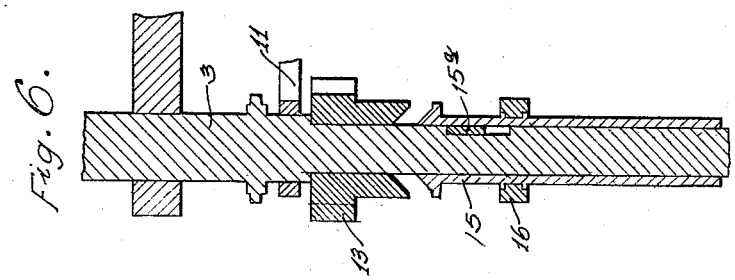
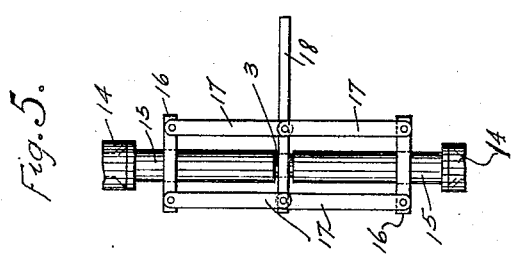
WITNESSES
INVENTOR
A. L. Negstad
By H. J. Sanders
Atty

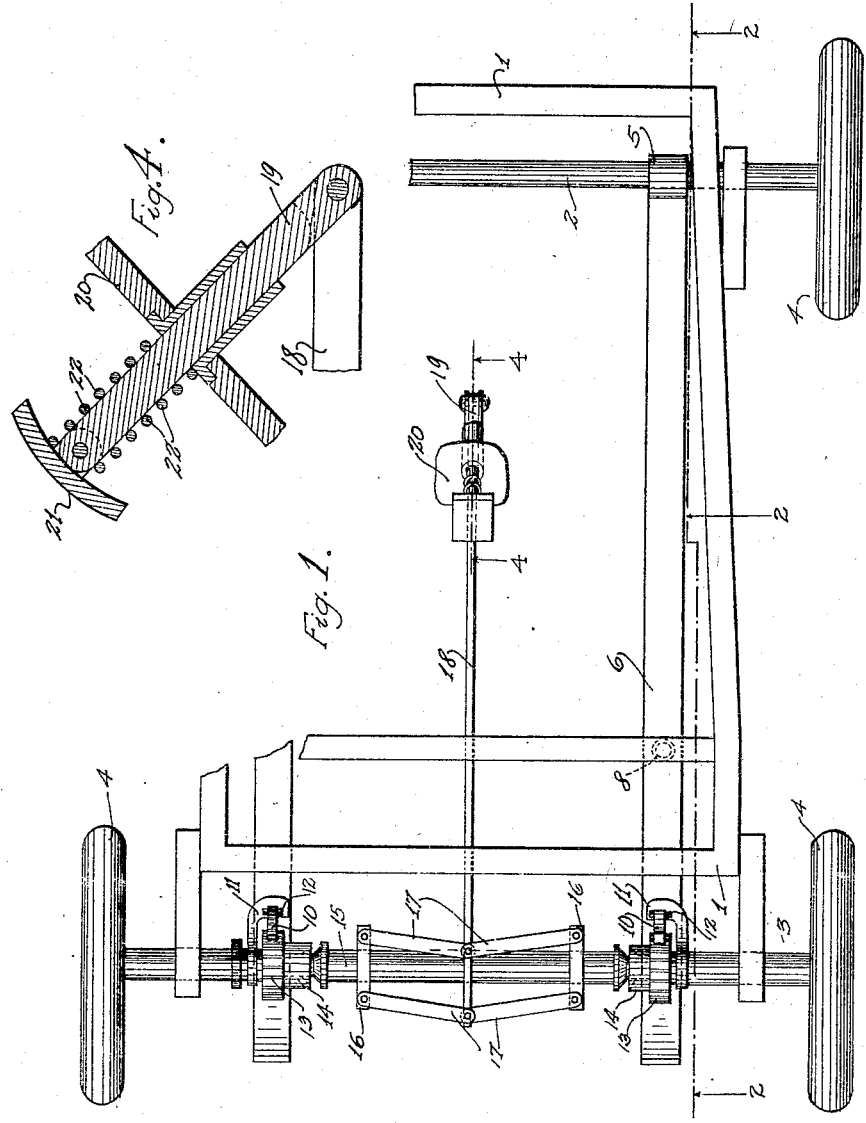

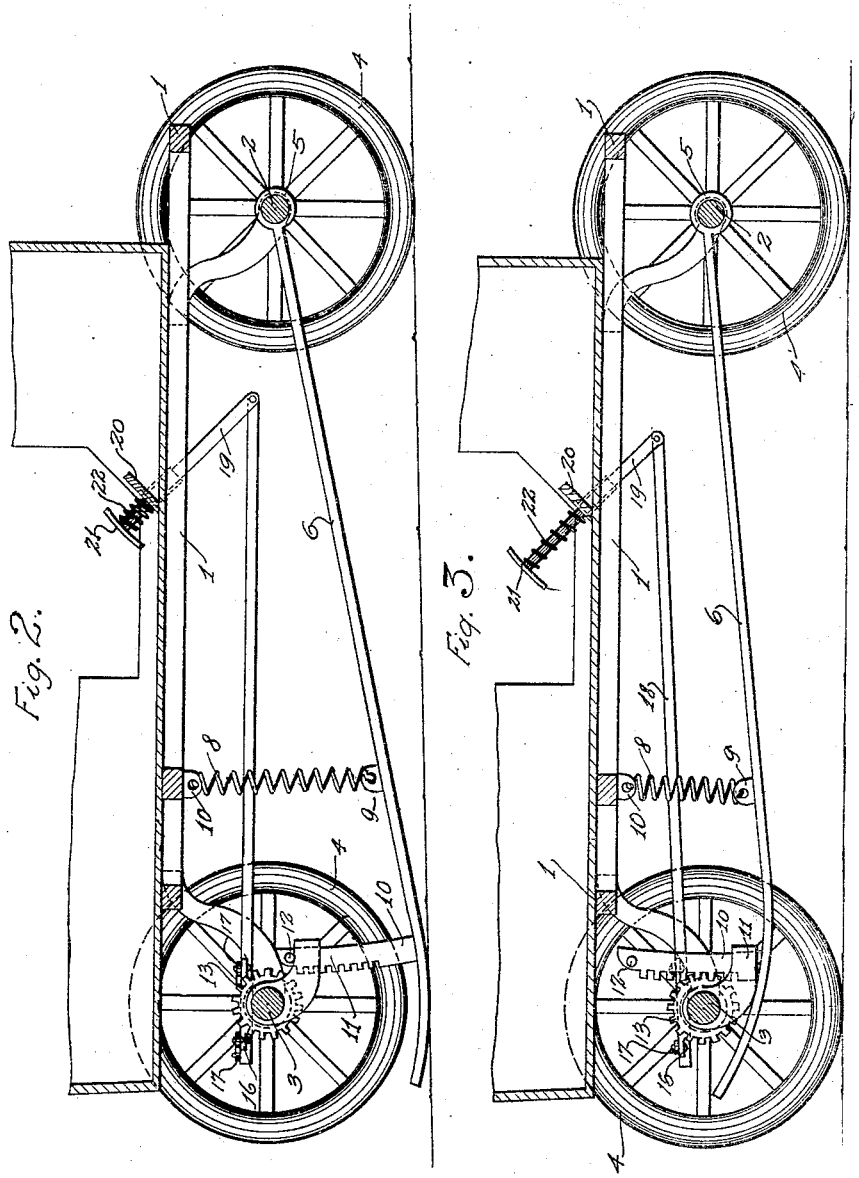

UNITED STATES PATENT OFFICE.

ALBERT L. NEGSTAD, OF ARLINGTON, SOUTH DAKOTA.

AUTOMOBILE-BRAKE.

1,205,378.  Specification of Letters Patent.  Patented Nov. 21, 1916.

Application filed January 22, 1916. Serial No. 73,557.

*To all whom it may concern:*

Be it known that I, ALBERT L. NEGSTAD, a citizen of the United States, residing at Arlington, in the county of Kingsbury and State of South Dakota, have invented certain new and useful Improvements in Automobile-Brakes, of which the following is a specification.

This invention relates to improvements in brakes and more particularly to brakes adapted primarily for use on automobiles.

The invention comprises a pair of brake shoes adapted, in operation, to frictionally engage the surface over which the machine is traveling and thereby bring the same to a quick stop. The operation of the brake is effected from the rear axle of the machine by means of a clutch arrangement on said axle which is controlled by a lever situated in close proximity to the driver's seat.

The invention, more specifically, consists in the combination and arrangement of parts to be hereinafter fully described in the following specification, pointed out in the appended claims and illustrated in the accompanying drawings which form a part of said specification and in which—

Figure 1 is a plan view of my improved brake showing its application to the frame of an automobile. Fig. 2 is a sectional side view of the frame of an automobile showing the application of my brake, taken on line 2—2—2 of Fig. 1. Fig. 3 is a view similar to Fig. 2 with some of the parts in an altered position. Fig. 4 is a section taken on line 4—4 of Fig. 1. Fig. 5 is a detail plan view of the clutch-throwing mechanism employed. Fig. 6 is a longitudinal sectional view of a portion of the rear axle of the vehicle showing the application of a portion of my brake. Fig. 7 is a sectional detail of the front axle of the machine. Fig. 8 is an inverted plan view of a portion of a brake shoe. Fig. 9 is a side elevation of the same.

Like reference characters indicate corresponding parts throughout the several views.

The reference numeral 1 denotes the frame of a vehicle carried upon a front axle 2 and a rear axle 3 which axles are provided with the wheels 4.

Upon the front axle 2 the sleeve-like ends 5 of the brake shoes 6 are disposed, said brake shoes being runner-shaped members and preferably corrugated or toothed as at 7 along a portion of their under periphery. The said runners are normally retained in inoperative or raised position, with relation to the vehicle frame, by means of the coil springs 8 that engage integral ears 9 of the runners and similar ears 10 of the frame 1. The free end of each runner is preferably curved upwardly as shown and a suitable distance back therefrom a vertical rack 10 is arranged which is slidably associated with a guide bracket 11 carried by the rear axle 3 and depending therefrom. The said rack 10, one upon each brake shoe, is provided with a transverse stop pin 12 which limits the movement of the said rack in one direction with relation to the bracket 11. The rack 10, further, is in mesh with a pinion 13 loose upon the axle 3 and formed with a clutch member 14 capable of operative connection with one of the clutch members 15 slidably connected by a key 15ª to the said axle 3. The clutch members 15, two in number, are provided with idlers 16 which are connected by links 17 with a pitman 18 connected to the control lever 19 which extends up through the frame 1 of the vehicle and through a guide plate 20 carried by said frame and is provided with a head 21 between which and the said guide plate the lever is provided with a pressure spring 22.

Normally the springs 8 retain the brake shoes off the ground and in the position illustrated in Fig. 3 and the spring 22 retains the lever 19 in raised relation with the frame 1 thus retaining, through the medium of pitman 18, the clutch members 15 out of engagement with the clutch members 14. The rear or drive axle is now running without effecting the brake mechanism. To apply the brakes the lever 19 is depressed by the driver into the position shown in Fig. 2 thus moving the pitman 18 toward the front of the machine and moving the links 17 into a position at right angles to the pitman and engaging the clutch members 15 with the members 14 thus rotating the pinions 13 which will depress the racks 10 and force the brake shoes into frictional engagement with the ground bringing the machine to a quick stop. Should the machine be traveling rapidly at the time the brake is applied the rear wheels may be lifted off the ground for an instant as shown in Fig. 2. As soon as pressure is removed from the lever 19 the spring 22 will return the same to normal position and the springs 8 will perform a like service for the brake shoes.

What is claimed is:—

1. The combination with the frame of a machine mounted upon axles, of brake shoes supported at one end upon one of said axles, flexible means connecting the body of said brake shoes with the said frame for yieldingly supporting the former members, racks carried by said brake shoes, pinions loose upon another of said axles and in mesh with said racks and foot-controlled means slidably keyed to said last named axle for operative engagement with said pinions to cause them to rotate with said axle.

2. The combination with the frame of a machine mounted upon axles, of toothed brake shoes supported at one end upon one of said axles, flexible members adapted to yieldingly support the other end of said brake shoes, racks carried by said brake shoes, pinions loose upon another of said axles and in mesh with the said racks, clutches slidably keyed to said last named axle for operative engagement with the said pinions to cause them to rotate with said axles, idlers carried by said clutches, a pitman, links pivotally connecting said pitman and idlers, a foot lever carried by said frame and connected to said pitman and a pressure spring carried by said lever for yieldingly retaining the same in inoperative relation.

3. The combination with the frame of a machine mounted upon axles, of toothed brake shoes supported at one end upon one of said axles, flexible members adapted to yieldingly support the outer end of said brake shoes, racks carried by said brake shoes, guide brackets for said racks carried by another of said axles, stop pins carried by said racks for limiting the movement thereof with relation to said guide brackets, pinions loose upon said last named shaft and in mesh with the said racks, clutches slidably keyed to said last named axle for operative engagement with the said pinions to cause them to rotate with said axle and foot-controlled actuating means for said clutches.

In testimony that I claim the foregoing as my own I have hereto affixed my signature in the presence of two subscribing witnesses.

ALBERT L. NEGSTAD.

Witnesses:
JOHN A. MAXWELL,
ARTHUR W. CARLSON.

Copies of this patent may be obtained for five cents each, by addressing the "Commissioner of Patents, Washington, D. C."